(12) United States Patent
Strassburger

(10) Patent No.: US 9,975,682 B2
(45) Date of Patent: May 22, 2018

(54) JEWELRY DISPLAY HANGER WITH SECURITY TAG

(71) Applicant: B&G Plastics, Inc., Union, NJ (US)

(72) Inventor: Jacob Strassburger, South Plainfield, NJ (US)

(73) Assignee: B&G Plastics, Inc., Union, NJ (US)

( * ) Notice: Subject to any disclaimer, the term of this patent is extended or adjusted under 35 U.S.C. 154(b) by 0 days. days.

(21) Appl. No.: 15/450,371

(22) Filed: Mar. 6, 2017

(65) Prior Publication Data
US 2017/0253408 A1     Sep. 7, 2017

Related U.S. Application Data

(60) Provisional application No. 62/304,362, filed on Mar. 7, 2016, provisional application No. 62/354,193, filed on Jun. 24, 2016.

(51) Int. Cl.
| | |
|---|---|
| *A45C 11/04* | (2006.01) |
| *B65D 79/02* | (2006.01) |
| *B65D 73/00* | (2006.01) |
| *A47F 5/00* | (2006.01) |
| *A47F 7/024* | (2006.01) |
| *G06K 19/077* | (2006.01) |

(52) U.S. Cl.
CPC ............ *B65D 79/02* (2013.01); *A47F 5/0006* (2013.01); *A47F 7/024* (2013.01); *B65D 73/0064* (2013.01); *G06K 19/07762* (2013.01)

(58) Field of Classification Search
CPC ..... B65D 79/02; B65D 73/0064; A47F 7/024; A47F 7/02; A47F 5/0006; G06K 19/07762

USPC ...... 206/6.1, 461, 473, 493, 806; 248/309.1, 248/317; 223/85, 87
See application file for complete search history.

(56) References Cited

U.S. PATENT DOCUMENTS

| | | |
|---|---|---|
| 4,714,156 A | 12/1987 | Kolton et al. |
| 4,765,467 A | 8/1988 | Kolton et al. |
| 4,768,649 A | 9/1988 | Kolton et al. |
| 4,930,692 A | 6/1990 | Smilow et al. |
| 5,110,019 A | 5/1992 | Kolton et al. |
| 5,123,577 A | 6/1992 | Kolton et al. |
| 5,222,638 A * | 6/1993 | Kolton ................ A47G 25/743 223/85 |
| 5,328,065 A | 7/1994 | Kolton et al. |
| 5,501,378 A | 3/1996 | Kolton et al. |
| 5,582,387 A | 12/1996 | Kolton et al. |
| 5,615,810 A | 4/1997 | Kolton et al. |
| 5,826,760 A | 10/1998 | Kolton et al. |
| 5,988,462 A | 11/1999 | Kolton |
| 6,073,758 A * | 6/2000 | Webster .................. A47F 7/02 206/523 |
| 6,206,253 B1 | 3/2001 | Kolton et al. |

(Continued)

*Primary Examiner* — Luan K Bui
(74) *Attorney, Agent, or Firm* — Hoffmann & Baron, LLP

(57) ABSTRACT

A jewelry display hanger includes a substantially flat body member having a hook on a first end, a first side and a second side both extending outwardly from the first end to a second end, and a closure device protruding outwardly from the first side, a base member extending from the second end of the body member, a closure member having a closure aperture, the closure member connected by the base member to the body member, and a security tag attached to one of the sides of the body member, wherein the closure device is configured to engage with the closure aperture.

12 Claims, 5 Drawing Sheets

(56) References Cited

U.S. PATENT DOCUMENTS

| | | | |
|---|---|---|---|
| 6,264,077 B1 * | 7/2001 | Kolton | A47G 25/743 223/87 |
| 6,299,039 B1 * | 10/2001 | Hsu | A47F 5/0006 223/85 |
| 6,561,358 B2 | 5/2003 | Kolton et al. | |
| 7,015,815 B1 * | 3/2006 | Feibelman | G08B 13/2434 206/6.1 |
| 7,143,892 B2 | 12/2006 | Kolton et al. | |
| 7,448,520 B2 | 11/2008 | Kolton et al. | |
| 8,286,882 B2 | 10/2012 | Norman et al. | |
| 8,308,291 B2 | 11/2012 | Norman et al. | |
| 8,651,344 B2 * | 2/2014 | Norman | A47G 25/005 223/87 |
| 9,480,347 B2 | 11/2016 | Strassburger et al. | |
| 9,585,496 B2 | 3/2017 | Strassburger et al. | |
| 2004/0217249 A1 * | 11/2004 | Eisenbraun | A47F 5/0006 248/323 |
| 2013/0015215 A1 * | 1/2013 | Coote | A47G 25/005 223/85 |
| 2016/0058208 A1 * | 3/2016 | Strassburger | A47F 5/0006 248/317 |
| 2016/0058209 A1 | 3/2016 | Strassburger et al. | |

\* cited by examiner

JEWELRY DISPLAY HANGER WITH SECURITY TAG

CROSS REFERENCE TO RELATED APPLICATIONS

This application claims priority to U.S. Provisional Patent Application No. 62/304,362, filed on Mar. 7, 2016 and U.S. Provisional Patent Application No. 62/354,193, filed on Jun. 24, 2016, the contents of which are incorporated herein by reference in its entirety.

FIELD OF THE INVENTION

The present invention relates to jewelry display hangers, and more particularly, to jewelry display hangers with a theft deterrent security tag.

BACKGROUND OF THE INVENTION

Small articles, such as jewelry, are commonly displayed for sale in retail stores on racks or in display cases where the articles are hung. A variety of different hangers and tags have been used to secure to small articles and to be suspended on a hook or the like, such as a pegboard hook for retail display. Because of jewelry's relative small size, it is hard to track each of them and can easily be stolen by consumers without security tags. The security tags can be enclosed in or attached to a variety of different devices, such as holders or housing, which accommodate the electronic tag and are used to attach the tags to article. This presents both manufacturing and assembling issues, which increase the cost and product complexity.

Accordingly, there is a need for an improved jewelry display hanger to prevent theft of the article by consumers, as well as simple cost efficient to manufacture.

SUMMARY OF THE INVENTION

According to an embodiment of the present invention, a jewelry display hanger includes a substantially flat body member having a hook on a first end, a first side and a second side both extending outwardly from the first end to a second end, and a closure device protruding outwardly from the first side, a base member extending from the second end of the body member, a closure member having a closure aperture, the closure member connected by the base member to the body member, and a security tag attached to one of the sides of the body member, wherein the closure device is configured to engage with the closure aperture.

These and other aspects of the present invention will be better understood in view of the drawings and following detailed description.

DETAILED DESCRIPTION OF PREFERRED EMBODIMENTS

Figure 1:
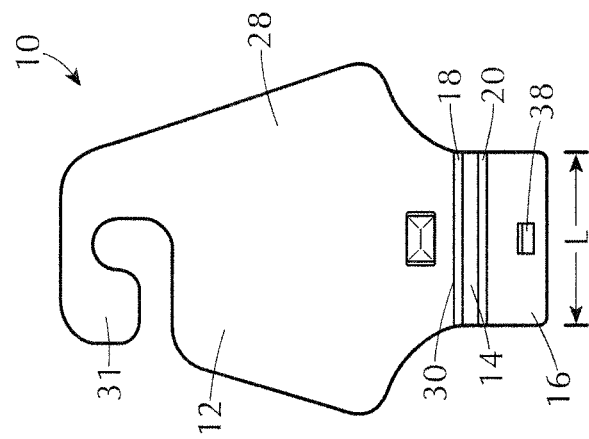
FIG. 1 is a perspective rear view of the jewelry display hanger, according to an embodiment of the present invention, in an open position.
Figure 2:
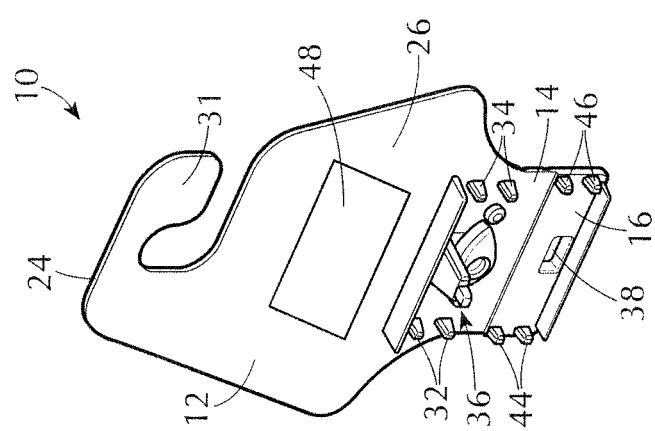
FIG. 2 is a front view of the jewelry display hanger in FIG. 1.

According to an embodiment of the present invention, referring to FIGS. 1 and 2, a jewelry display hanger 10 includes a body member 12, a base member 14 and a closure member 16. A first foldline 18 and a second foldline 20, such as crease, are defined between the body and base members 12, 14 and between the base and closure members 14, 16, respectively.

Referring to FIGS. 1-6, the body member 12 is substantially flat having a first end 24 and a first side 26 and a second side 28 extending outwardly from the first end 24 to a second end 30. A hook 31 is positioned at the first end 24. First and second pairs of closure teeth 32, 34 are formed integrally from the first side 26 of the body member 12 and protrude outwardly therefrom. A closure device 36 is also formed integrally from the first side 26 of the body member 12 and protrudes outwardly from the first side 26. The closure device 36 is designed and configured to be inserted through a closure aperture 38 of the closure member 16 to provide a locking mechanism, as will be described in greater details below.

Figure 4:
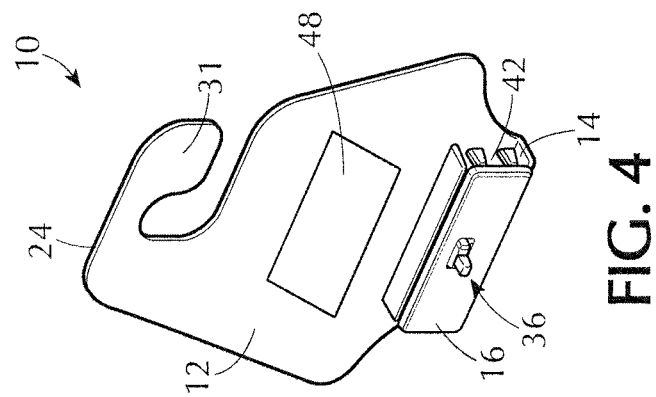
FIG. 4 is a perspective rear view of the jewelry display hanger in FIG. 1 in a locked and closed position.
Figure 3:
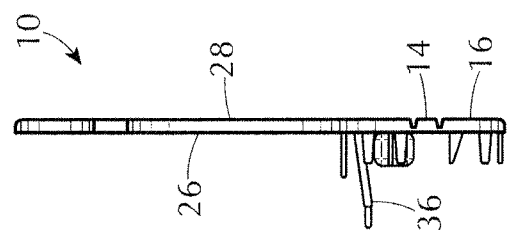
FIG. 3 is a side view of the jewelry display hanger in FIG. 1.
Figure 6:
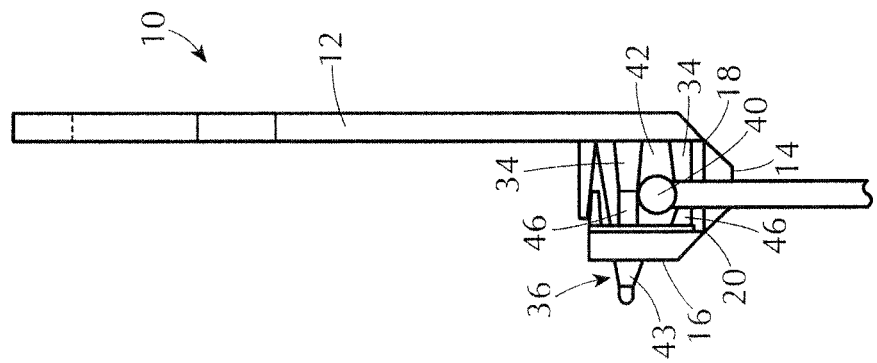
FIG. 6 is a side view of the jewelry display hanger in FIG. 4.
Figure 5:
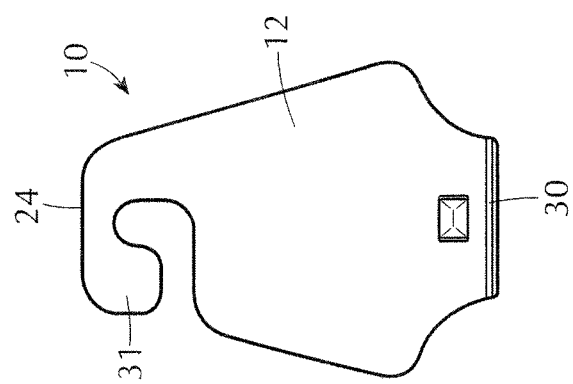
FIG. 5 is a front view of the jewelry display hanger in FIG. 4.

The base member 14 is substantially flat and extends from the second end 30 and connects the closure member 16 to the body member 12. Each of the base and closure members 14, 16 has a length of "L" which is equal to the length of each of the first and second foldlines 18, 20. The first and second foldlines 18, 20 define a boundary between the body and base members 12, 14 and a boundary between the base and closure members 14, 16, respectively, allowing the base and closure members 14, 16 to be folded along the foldlines 20, 22 to transition the jewelry display hanger 10 between open (FIGS. 1-3) and closed positions (FIGS. 4-6). When the jewelry display hanger 10 is fully assembled with the part of the article 40 trapped inside the jewelry display hanger 10 as shown in FIG. 6, the base member 14 supports the part of the article 40 in an article tunnel 42 formed via the body, base and closure members 12, 14, 16 such that the article 40 can be suspended below the base member 14. The length of the article tunnel 42 is equal to the width of the base member 14.

The closure member 16 extends from the base member 14 and defines the closure aperture 34 through which the closure device 32 is inserted to completely surround the part of the article that is placed within the article tunnel 42. Contours of the closure aperture 34 and the closure device 32 are configured such that, when engaged, they provide a locking mechanism, with and a tip 43 of the closure device 32 protruding outwardly from the closure aperture 34, as illustrated in FIG. 6. Once the jewelry display hanger 10 is in the locked and closed position, it is extremely difficult to open it with bare hands to separate the article 40 from the jewelry display hanger 10. In fact, the locked jewelry display hanger 10 is not readily openable without destruction of the hanger 10. The article 40 can be separated from the locked jewelry display hanger 10 by cutting the closure member 16 along a cut tab 45 defined thereon.

Referring again to FIGS. 1 and 6, third and fourth pairs of closure teeth 44, 46 are formed integrally from the closure member 16, which, in the closed position, are aligned with the first and second pairs of closure teeth 32, 34, respectively. The closure teeth 32, 34, 44, 46 are configured to allow the part of the article 40 to be remained in the article tunnel 42 thereby, preventing the article to be separated from the jewelry display hanger 10.

Referring more particularly to FIGS. 1 and 4, it is contemplated that a security tag or marker 48 may be applied to the first or second side 26, 28 of the body member 12. In addition to the security tag 48, other pictures (logos) or text (product descriptions) may be printed on, embossed in, or otherwise attached to the first or/and second side(s) 26, 28 of the body member 12.

The security tag 48 attached to the article has a wide variety of uses, including tracking, inventory control and security. The security tag 48 can also provide electronically readable information pertaining to the articles. The security tag 48 is a radio frequency identification (RFID) tag, an electronic article surveillance (EAS) device or the like. The security tag 48 is firmly secured to the jewelry display hanger 10 such that it remains with the article until after the time of purchase.

Figure 8:
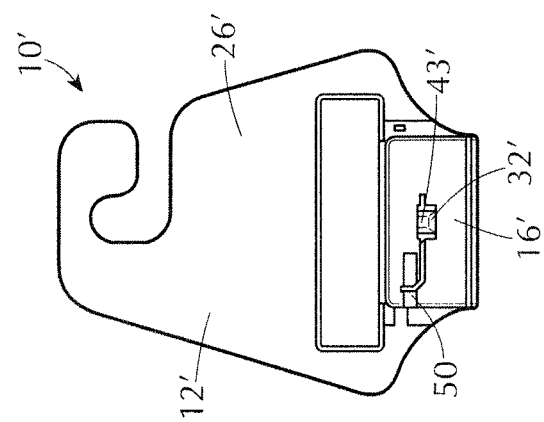
FIG. 8 is a rear view of the jewelry display hanger in FIG. 7 in a locked and closed position.
Figure 7:
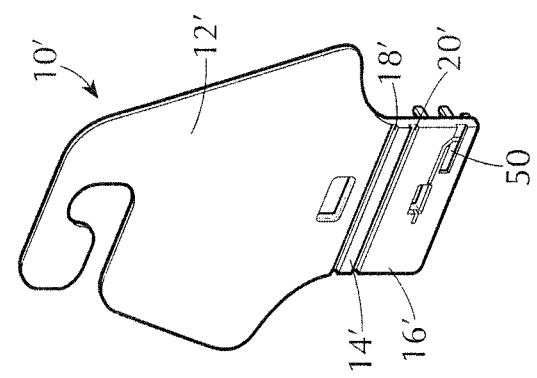
FIG. 7 is a perspective front view of the jewelry display hanger, according to a further embodiment of the present invention, in an open position.
Figure 9:
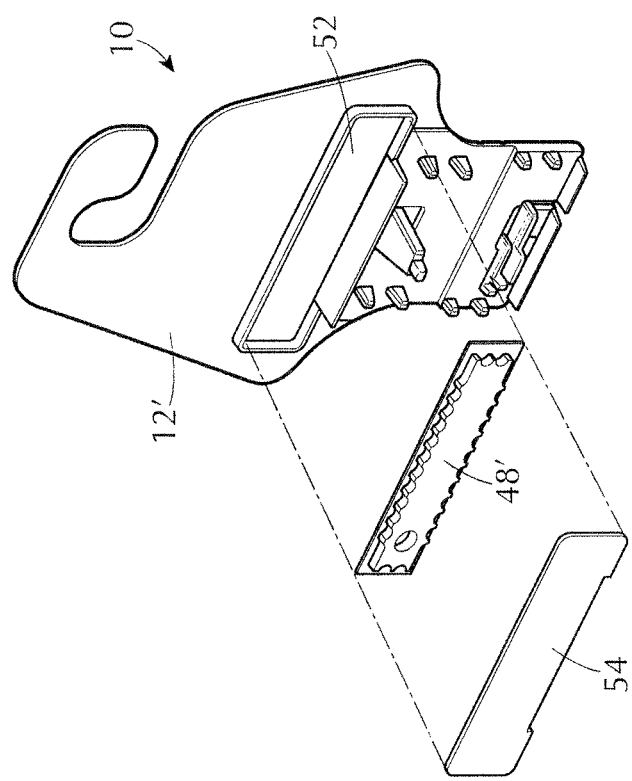
FIG. 9 is an exploded perspective view of the jewelry display hanger in FIG. 8.

Referring to FIGS. 7-9, a further embodiment of the jewelry display hanger 10 is disclosed. The jewelry display hanger 10' is substantially similar to the jewelry display hanger 10 described with respect to FIGS. 1-6. Similar reference numbers will be used to refer to similar components.

In the present embodiment, a cut tab 50 is defined on a closure member 16' of a jewelry display hanger 10'. The cut tab 50 is grooved such that an article can be separated from the locked jewelry display hanger 10' by cutting the closure member 16' along the cut tab 50.

In addition, a recess 52 is formed on a first or second side of a body member 12' of the jewelry display hanger 10', as shown in FIG. 9. A security tag 48' may be embedded within the jewelry display hanger 10' by disposing the security tag 48' within the recess 52 and sealing it with a cover 54 by welding.

In use of the jewelry display hanger 10', first, in the open position, a necklace clasp 40 is placed to the first side 26' of the body member 12'. Then, by folding the base and closure members 14', 16' along the first and second foldlines 18', 20' and closing the closure member 16' by locking it via the closure device 32', the jewelry display hanger 10' is ready for suspension on a display hook or the like, such as a pegboard hook for retail display. Once a consumer purchases the article, the consumer can remove it from the jewelry hanger display 10' by cutting or clipping the tip 43' of the closure device 32' or the cut tab 50 to allow the closure member 16' to be open.

From the foregoing, it will be appreciated that a jewelry display hanger according to the present invention may be used for anti-theft, tracking and inventory control, while providing the design that is convenient for merchants to display their goods.

In general, the foregoing description is provided for exemplary and illustrative purposes; the present invention is not necessarily limited thereto. Rather, those skilled in the art will appreciate that additional modifications, as well as adaptations for particular circumstances, will fall within the scope of the invention as herein shown and described and of the claims appended hereto.

What is claimed is:

1. A jewelry display hanger comprising:
   a substantially flat body member having a first end, a second end, a first side having first and second pairs of closure teeth formed thereon, a second side, and a closure device protruding outwardly from the first side;
   a base member extending from the second end of the body member; and
   a closure member having a closure aperture and third and fourth pairs of closure teeth formed thereon, the closure member connected by the base member to the body member,
   wherein the closure device is configured to engage with the closure aperture to provide a locking mechanism, and
   wherein, when the closure device is engaged with the closure aperture, an article tunnel is defined between the body, base and closure members, and the third and fourth pairs of closure teeth align with the first and second pairs of closure teeth, respectively.

2. The jewelry display hanger of claim 1, wherein the body member includes a hook on the first end.

3. The jewelry display hanger of claim 1, wherein the first and second sides both extending outwardly from the first end to the second end.

4. The jewelry display hanger of claim 1, wherein a first foldline and a second fold line are defined between the body and base members and between the base and closure members, respectively, allowing the base and closure members to be folded along the first and second foldlines to transition the jewelry display hanger between open and closed positions.

5. The jewelry display hanger of claim 1, wherein, contours of the closure aperture and the closure device are configured such that, when engaged, they allow the jewelry hanger to be in the locked and closed position.

6. The jewelry display hanger of claim 1, further comprising a security tag.

7. The jewelry display hanger of claim 6, wherein the security tag is attached to one of the first and second sides of the body member.

8. The jewelry display hanger of claim 6, wherein a recess is formed on one of the first and second sides of the body member.

9. The jewelry display hanger of claim 8, wherein the security tag is disposed within the recess and sealed with a cover by welding.

10. The jewelry display hanger of claim 6, wherein the security tag is used for tracking, inventory control and security.

11. The jewelry display hanger of claim 6, wherein the security tag is a radio frequency identification tag or an electronic article surveillance device.

12. The jewelry display hanger of claim 5, wherein a cut tab is defined on the closure member such that the locked jewelry display hanger can be opened by cutting the cut tab.

* * * * *